Sept. 19, 1967  B. C. DILLON ET AL  3,342,960
FLUID LEVEL SENSING AND INDICATING DEVICE
Filed Oct. 25, 1963

BERNARD CHARLES DILLON
SALVATORE ACAMPORA
INVENTORS

BY J. O. St. Palley
Patent Agent

3,342,960
FLUID LEVEL SENSING AND INDICATING DEVICE

Bernard Charles Dillon, 787 Whitney Ave. 06511, and Salvatore Acampora, 18 Alton St. 06513, both of New Haven, Conn.; Frances M. Dillon, administratrix of the estate of said Bernard Charles Dillon, deceased, assignor to Frances M. Dillon, individually
Filed Oct. 25, 1963, Ser. No. 318,936
9 Claims. (Cl. 200—84)

Our invention relates to low fluid level indicating safety devices and more particularly to safety devices used in motor vehicles for indicating dangerously low brake fluid level.

The use of hydraulic brakes is general in modern motor vehicles. It is known that the loss of the brake fluid, usually caused by leakage, renders the hydraulic brake inoperative, which is the constant cause of innumerable, often fatal, automobile accidents. Unfortunately, the average motorist knows very little about his hydraulic brake system, so that the inspection of the brake fluid level is often neglected for long periods and the depletion is noticed only too late, when the brake fails to operate.

The principal object of the present invention to provide a safety device which eliminates the hazard of the depletion of the brake fluid by giving a visual signal to the motorist when the replenishment of the brake fluid is needed well before the brake system has become ineffective, and, as a further safety measure, if the visual signal is unheeded, it will automatically immobilize the motor vehicle when it is in imminent danger of losing its braking power and until the brake fluid level has been brought to its normal height.

Another important object of the present invention is to provide a safety device for the elimination of the danger of the loss of braking power due to the depletion of the brake fluid which is positive and reliable in operation, which can be easily installed in any car, requires no upkeep or attention after installation, and which is economical in the manufacturing.

Other objects and advantages of the present invention will be apparent during the course of the following description.

Figure 1:
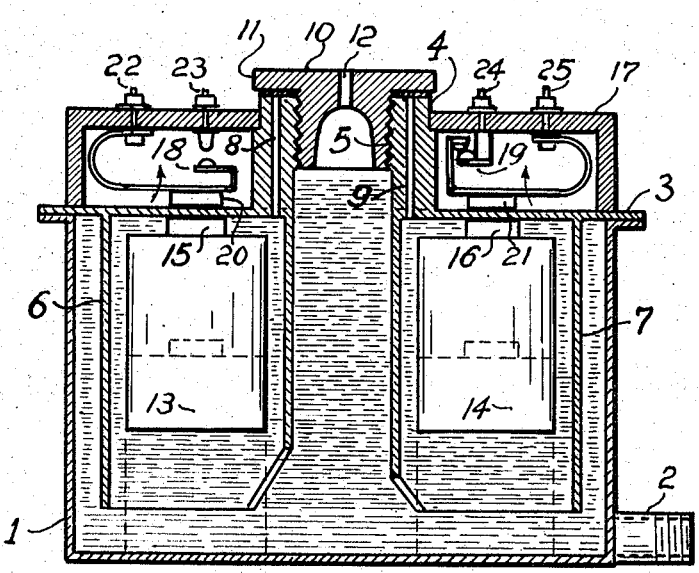
Figure 2:
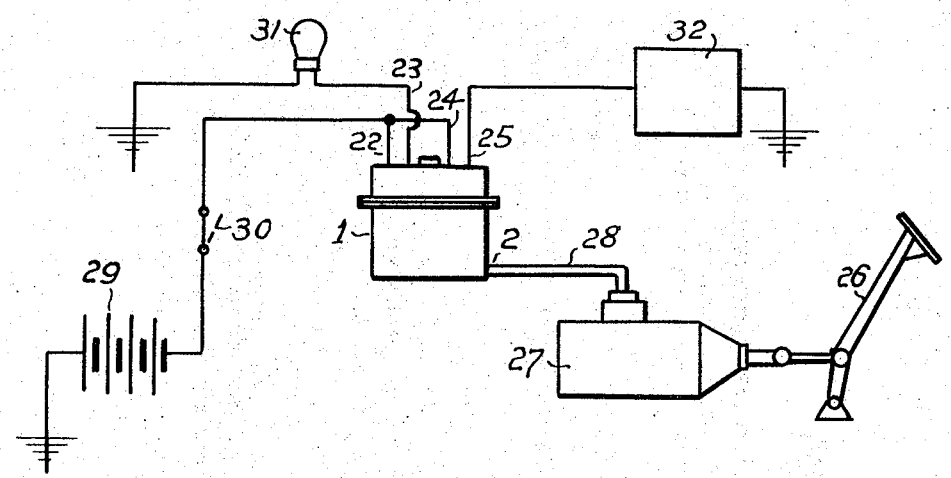

In the accompanying drawing, forming a part of this application, wherein for the purpose of illustration is shown a preferred form of our invention, FIGURE 1 is a vertical sectional view of the preferred form of our brake fluid safety device, FIGURE 2 is a schematic view showing the preferred method of connection of our brake fluid safety device with the cooperating elements of the motor vehicle.

Referring to FIG. 1 of the drawing, the numeral 1 designates the casing of our device, which is preferably rectangular in shape and is provided with an outlet 2 at the base arranged for pipe connection to a brake fluid reservoir and master cylinder as hereinafter described. Hermetically secured to the top of the casing is a cover 3, which is made of non-magnetic material and is provided with a cylindrical filling neck 4 having a filling opening 5. Hermetically secured to the lower surface of the cover 3 are a pair of cylindrical float chambers: the first chamber 6 and the second chamber 7, which can communicate with the ambient atmosphere through air exhaust openings 8 and 9, respectively, passing through cover 3 and the wall of filling neck 4. The float chambers 6 and 7 have open bottoms and, in the preferred form illustrated, the perimeter of the bottom openings of the chambers are cut in, each having a V-shape notch the tip of which represents the highest point of the perimeter. It is essential that the highest point of the bottom perimeter is located at a higher level in the first chamber 6 than in the second chamber 7. Threadedly secured within the filling opening 5 of the filling neck 4 is the filling plug 10, having a gasketed flange 11 adapted to close the air exhaust openings 8 and 9 hermetically when the plug 10 is in place. The plug 10 is provided also with a vent opening 12 permitting communication between the interior of the filling neck 4 and the outside atmosphere. Disposed within the chambers 6 and 7 are floats 13 and 14, respectively, which are preferably cylindrical in shape. Mounted on the top of each float is a permanent magnet, marked 15 and 16 on the drawing. These floats have vertically variable positions depending on the fluid level in the respective chambers. When the float chamber is filled with fluid the float assumes its highest position in which the magnet lies adjacent to the lower surface of the cover 3. With lowering fluid level in the chamber the float sinks until its rests on the base of the casing 1 when the chamber is empty.

Located above the cover 3 and enclosed in the housing 17 are electric switches 18 and 19, each being equipped with a soft iron keeper 20 and 21, respectively, so positioned that in the highest position of the float the magnet exerts a strong attractive force to the respective keeper. Each switch is also provided with a spring adapted to return the switch into the original position when the magnet is removed from the keeper due to the lowering of the float. In the preferred form illustrated, switch 18 disposed above float chamber 6 is so constructed that in the highest position of float 13, keeper 20, attracted by magnet 15, will move switch 18 into the open position and, when the magnet is lowered, switch 18 will return automatically, by spring power, into its closed position. The second switch 19, located above the float chamber 7, has just the opposite sequence of operation. In the highest position of float 14, keeper 21, attracted by magnet 16, will move switch 19 into its closed position and, when magnet 16 is lowered switch 19 returns automatically, by spring power, into its open position.

In the application of the present invention in motor vehicles the preferred connections between the above described safety device and the cooperating elements of the motor vehicle are illustrated in FIG. 2 of the drawing. In this schematic view a numeral 27 represents the brake fluid reservoir and master cylinder, operated by a pedal 26. This reservoir is connected by pipe 28 to the outlet opening 2 of the safety device, the base of the casing 1 being at slightly higher level than the top opening of the reservoir 27. The numeral 29 represents a storage battery, one terminal of which is grounded and the other terminal is connected, through a starting switch 30 of the motor vehicle, to terminals 22 and 24 of the two switches 18 and 19, respectively. The other terminal 23 of switch 18 is connected to an indicating or signal light 31, while the other terminal 25 of switch 19 is connected to the ignition device of the motor vehicle.

The operation of my invention is as follows: By removing the plug 10 brake fluid is poured through the filling opening 5 until the fluid level is slightly above the cover 3, with the result that the float chambers 6 and 7 will be completely filled having the air displaced therefrom through the exhaust openings 8 and 9. As a result of this, floats 13 and 14, carrying the magnets 15 and 16, respectively, will rise to their highest positions illustrated by full lines in FIG. 1. In this position, the attraction of magnet 15 will move switch 18 into its open position causing the deenergizing of signal light 31; also the attraction of magnet 16 will move switch 19 into its closed position thereby closing the energizing circuit of the ignition device of the motor vehicle. Following this, plug 10 is inserted and secured tightly until the flange 11 will hermetically close the exhaust openings 8 and 9 of the float chambers 6 and 7, respectively. This being the normal operating position of the device, which will not change until a leak develops in the hydraulic system of the brake.

In case of a leak in the hydraulic system the fluid level in the casing 1 will be gradually lowered, but, as the top of the float chambers 6 and 7 are sealed by the flange 11 of plug 10, gasket 11 covering exhaust openings 8 and 9, the fluid columns in the chambers 6 and 7 will be held up by the atmospheric pressure acting on the fluid in neck 4 through vent opening 12 for this keeps the floats 13 and 14 in their highest position shown by the full lines in FIG. 1. When the sinking fluid level in the casing reaches the highest point of the perimeter of the bottom opening of the first chamber 6. After this, a further lowering of the fluid level in the casing will cause the openings or lower edges of chamber 6 to be above the level of fluid in casing 1. At this time there is no support for the column of fluid in chamber 6 and the fluid level therein will fall. Otherwise stated, air in casing 1 will enter chamber 6 and displace fluid therein. When the fluid level in chamber 6 falls float 13 and magnet 15 will move downwardly, permitting the switch 18 to be closed by its spring and thereby energize the signal light 31. By this visual signal the motorist is now warned that the replenishment of the brake fluid is necessary. If this warning is not heeded and the fluid level in the casing is further lowered, when it reaches the perimeter of the bottom opening of the second chamber 7, this chamber will be emptied in the same manner as described in conjunction with chamber 6, with the result, that switch 19 will return into its open position thereby interrupting the ignition circuit of the motor vehicle. This immobilization of the motor vehicle occurs before the depletion of the brake fluid has actually reached the point when the brake system becomes inoperative. This immobilization of the motor vehicle will continue until the depletion of the brake fluid is remedied by removing the plug 10 and adding brake fluid until the level is slightly above the cover 3, and then replacing the plug 10. With plug 10 removed, fluid introduced through the filling opening will rise in the casing 1 and as it rises above the lower perimeter or openings in chambers 6 and 7 the ambient air pressure acting thereon will cause fluid to rise in chambers 6 and 7 exhausting the air therein through openings 8 and 9. When the fluid in casing 1 rises above cover 3 the atmospheric pressure acting on the surface thereof raises the fluid level in chambers 6 and 7 to cover 3, completely exhausting air therefrom. Thereafter the fluid in chambers 6 and 7 is supported by the air pressure acting on the surface of the fluid in casing 1 without chambers 6 and 7, and the fluid level in chambers 6 and 7 will not fall until the fluid level in casing 1 falls below the highest points on the perimeters of chambers 6 and 7. As chambers 6 and 7 are filled with fluid, floats 13 and 14 rise therein and open switch 18 and close switch 19 through the attractive forces of magnets 15 and 16, respectively. This causes the switching off of the signal light 31 and the reconnection of the ignition system of the motor vehicle with the energy supplying storage battery.

Thus, the present invention not only warns the motorist when the replenishment of the brake fluid is necessary, but actually makes the occurrence of an accident due to the loss of brake power impossible by immobilizing the vehicle before the brake system has become inoperative and by keeping the vehicle immobilized until the brake fluid is replenished.

It is to be understood that the form of our invention herein described and illustrated is only an example of the same and that various changes in the shape, size, and arrangement of parts may be resorted to, without departing from the spirit of our invention or the scope of the subjoined claims.

We claim:

1. For use in a motor vehicle in combination with a brake fluid reservoir and master brake cylinder, a device for sensing and indicating levels of brake fluid comprising, wall means defining a fluid tight casing, a non-magnetic cover hermetically secured to said casing, a neck portion defining a filling opening and providing communication through said cover to the interior of said casing, first and second chambers each having peripherally continuous side walls hermetically attached to and depending from said cover, an air exhaust opening defined through said cover to each of said chambers, each of said chambers having open bottoms communicating with the interior of said casing, the distance from the cover to the highest point of the bottom perimeter of one of said chambers being greater than the distance from the cover to the highest point of the bottom perimeter of the other of said chambers, a closure member adapted to be secured in said filling opening and close said exhaust openings, said closure member having a vent therein providing communication between the ambient atmosphere and the interior of said casing, first and second floats in said first and second chambers, respectively, each of said floats carrying a magnet on the upper surface thereof so that when said chambers are filled with fluid and said floats rise to their uppermost position said magnets are adjacent the lower surface of said cover, magnetically actuated switching means located above said cover over each of said float chambers, each of said switching means actuated between OFF and ON positions by the presence or lack of presence of a float at the top of its chamber, said floats remaining in their uppermost position when said chambers have fluid therein and the level of fluid in said casing is above the highest point of the bottom perimeters of said chambers and while the ambient air pressure acting on the fluid in said casing through said vent maintains the level of fluid in said chambers and said floats from sinking with the level of the fluid in said casing until the level of the fluid in said casing drops below the bottom perimeters of said floats and allows air to enter said float chambers and displace the liquid therein, said floats upon successively falling in said float chambers actuating first one and then the other of said switching means.

2. For use in a motor vehicle in combination with a brake fluid reservoir and master brake cylinder an electric ignition circuit, a device for sensing and indicating levels of brake fluid comprising, wall means defining a fluid tight casing, a non-magnetic cover hermetically secured to said casing, a neck portion defining a filling opening and providing communication through said cover to the interior of said casing, first and second chambers each having peripherally continuous side walls hermetically attached to and depending from said cover, an air exhaust opening defined through said cover to each of said chambers, said chambers having open bottoms communicating with the interior of said casing, the distance from the cover to the highest point of the bottom perimeter of one of said chambers being greater than the distance from the cover to the highest point of the bottom perimeter of the other of said chambers, a closure member adapted to be secured in said filling opening and close said exhaust openings, said closure member having a vent therein providing communication between the ambient atmosphere and the interior of said casing, first and second floats in said first and second chambers, respectively, each of said floats carrying a magnet on the upper surface thereof so that when said chambers are filled with fluid and said floats rise to their uppermost position said magnets are adjacent the lower surface of said cover, magnetically actuated switching means located above said cover over each of said float chambers, each of said switching means actuated between OFF and ON positions by the presence or lack of presence of a float at the top of its chamber, said floats remaining in their uppermost position when said chambers have fluid therein and the level of fluid in said casing is above the highest point of the bottom perimeters of said chambers and while the ambient air pressure acting on the fluid in said casings through said vent maintains the level of fluid in said chambers and said floats from sinking with the level of the fluid in said casing until the level of the fluid in said casing drops below the bottom perimeters of said floats and allows air to enter said float chambers and displace the liquid therein, said floats upon successively falling in said float chambers actuating first one and then the other of said switching means, one of said switching means actuated by the first falling float being connected in a circuit including a warning light to indicate a first level of fluid in said casing, said second switch being connected in the ignition circuit of the vehicle and effective to disable said ignition circuit when the level of fluid in said casing falls to a second predetermined level.

3. A brake fluid safety device comprising a casing containing a depletable quantity of brake fluid, a non-magnetic cover hermetically attached to the top of said casing and defining a filling opening therein, a pair of float chambers each having continuous peripheral sidewalls depending from said cover, each of said float chambers having an air exhaust opening communicating through said cover with the ambient atmosphere, each of said float chambers having a bottom opening, said opening being located at first and second distances below said cover, a closure member adapted to close said filling opening and said exhaust openings, said closure member having a vent opening therein providing communication between the interior of said casing and the ambient atmosphere, a float in each of said float chambers, each of said floats having vertically variable positions depending on the fluid level in its respective chamber, switching means disposed above each of said float chambers without said casing, and switch actuating means carried by each of said floats and arranged to actuate one of said switching means, each of said switching means having first and second operating positions determined by the position of an associated float in one of said chambers.

4. A brake fluid safety device adapted to be engaged in fluid communication with the master brake cylinder and reservoir of a vehicle comprising, a casing, a cover member attached to said casing and having a filling opening therein, first and second wall means defining first and second float chambers extending downwardly from said cover, air exhaust openings defined in said cover and providing communication between the ambient atmosphere and each of said chambers, a closure member for said filling opening and having a vent therein providing communication between the interior of said casing and the ambient atmosphere, said closure member closing said exhaust openings when positioned to close said filling openings, a float member in each chamber, each of said wall means having an opening therein, the highest points of which are at predetermined distances below said cover, said predetermined distances being unequal, first and second electric switches, each of said switches being disposed above one of said chambers and operated in response to the position of said floats in said float chambers, said floats when said casing is filled with fluid rising to the tops of said float chambers and when the fluid level in said casing falls below said bottom perimeters falling successively downwardly as liquid falls in said chambers.

5. A brake fluid safety device adapted to be engaged in fluid communication with the master brake cylinder and reservoir of a vehicle comprising, a casing, a cover member attached to said casing and having a filling opening therein, first and second wall means defining first and second float chambers extending downwardly from said cover, air exhaust openings defined in said cover in communication with each of said chambers, a closure member for said filling opening and having a vent therein providing communication between the interior of said casing and the ambient atmosphere, said closure member closing said exhaust openings when positioned to close said filling opening, a float member in each chamber, each of said wall means having a lower edge, the highest points of which are at predetermined distances below said cover, said predetermined distances being unequal, first and second electric switches, each of said switches being disposed above one of said chambers and operated in response to the position of one of said floats in its associated float chamber, said floats when said casing is filled with fluid rising to the tops of said float chambers and when the fluid level in said casing falls below said bottom perimeters falling successively downwardly as liquid falls in said chambers.

6. A casing having a cover and a neck portion extending above said cover, said casing being fillable with fluid through said neck portion and said neck portion providing communication between the interior of said casing and the ambient atmosphere, first and second walls enclosing 360° extending downwardly from said cover within said casing and defining chambers open at the bottom thereof in communication with the interior of said casing, an opening in the walls of each of said chambers above the bottoms thereof, the openings in the chamber walls located at different distances from said cover so that when the fluid level in said casing falls below said chamber openings and air is admitted therein through said vent, first one of said chambers and then the other of said chambers has air admitted therein, air exhaust vents defined in said cover providing communication between each of said chambers and the ambient atmosphere to allow air to exhaust from said chambers and said chambers to fill with fluid when said casing is filled with fluid in an amount which fills said casing and extends above said cover in said neck, and a closure member for closing said neck portion and said air exhaust vents, said closure member having a vent opening therein providing communication with the interior of said casing and the ambient atmosphere.

7. The device of claim 6 further including means for sensing when fluid is displaced from said chambers.

8. A device adapted to sense a predetermined liquid level in a container comprising, a casing, a cover member attached to said casing and having a filling opening therein, wall means within said casing defining a float chamber extending downwardly from said cover, the bottom of said chamber being open and providing communication between the interiors of said casing and said chamber, an air exhaust opening defined in said cover in communication with said chamber, a closure member adapted to close said filling opening and having a vent therein providing communication between the interior of said casing and the ambient atmosphere, said closure member closing said exhaust opening when positioned to close said filling opening, a float member in said float chamber, said wall means having a lower edge, the highest point of which is located a predetermined distance below said cover so that when the liquid level in said casing falls below said edge, air is admitted to said chamber and liquid exhausted therefrom, and means responsive to the position of said float in said chamber for sensing when a predetermined amount of liquid is exhausted from said chamber.

9. A device adapted to sense a predetermined liquid level in a container comprising, a casing, a cover member attached to said casing and having a filling opening therein, wall means within said casing defining a float chamber extending downwardly from said cover, an opening in the wall of said chamber providing communication with the interior thereof and the interior of said casing, an air exhaust opening defined in said cover in communication with said chamber to allow venting of said chamber to the ambient atmosphere upon filling of said casing with liquid, a closure member adapted to close said filling opening and having a vent therein providing communication between the interior of said casing and the ambient atmosphere, said closure member closing said exhaust opening when positioned to close said filling opening, a fluid buoyant float member in said float chamber, said opening in said chamber being located a predetermined distance below said cover so that when the liquid level in said casing falls below said chamber opening, air is admitted to said chamber and fluid exhausted therefrom, and means responsive to the position of said float for sensing when a predetermined amount of fluid is exhausted from said chamber.

References Cited

UNITED STATES PATENTS 2,388,645   11/1945   Rowe et al. _____ 200—84 X

BERNARD A. GILHEANY, *Primary Examiner.*

H. A. LEWITTER, *Assistant Examiner.*